No. 644,474. Patented Feb. 27, 1900.
J. O. SHAFFER.
APPARATUS FOR MAKING SHEET GLASS.
(Application filed Nov. 4, 1899.)
(No Model.) 2 Sheets—Sheet 1.

WITNESSES
George Kane
Geo. M. Copenhaver

John O. Shaffer
INVENTOR
by Connolly Bros.
Attorneys

No. 644,474. Patented Feb. 27, 1900.
J. Q. SHAFFER.
APPARATUS FOR MAKING SHEET GLASS.
(Application filed Nov. 4, 1899.)
(No Model.) 2 Sheets—Sheet 2.
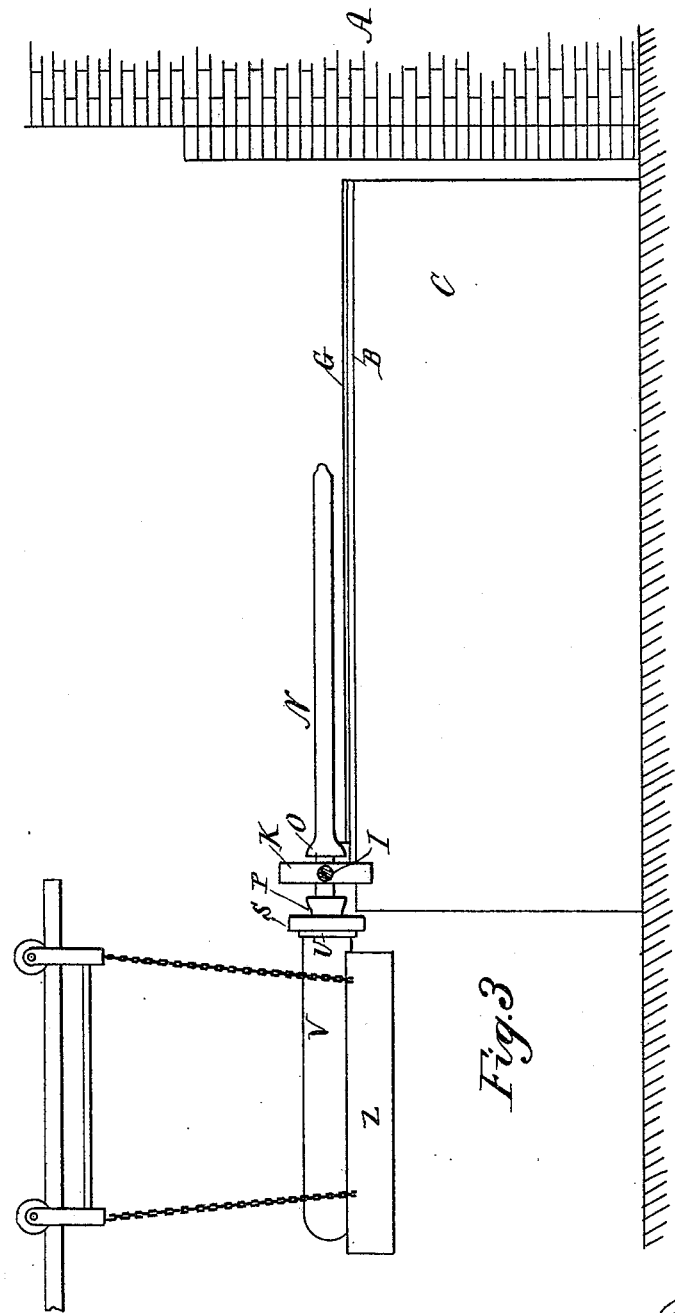
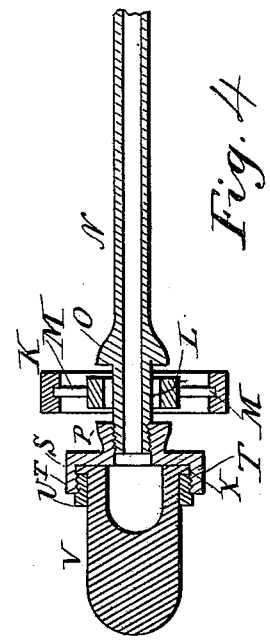

UNITED STATES PATENT OFFICE.

JOHN Q. SHAFFER, OF PITTSBURG, PENNSYLVANIA.

APPARATUS FOR MAKING SHEET-GLASS.

SPECIFICATION forming part of Letters Patent No. 644,474, dated February 27, 1900.

Application filed November 4, 1899. Serial No. 735,767. (No model.)

*To all whom it may concern:*

Be it known that I, JOHN Q. SHAFFER, a citizen of the United States, residing at Pittsburg, in the county of Allegheny and State of Pennsylvania, have invented certain new and useful Improvements in Apparatus for Making Sheet-Glass; and I do hereby declare the following to be a full, clear, and exact description of the invention, such as will enable others skilled in the art to which it appertains to make and use the same.

My invention has relation to apparatus for making sheet-glass, and has for its object the provision of means for forming sheet-glass by the blowing process in larger sheets and in sheets of greater thickness than has been possible by the ordinary method and at the same time relieving the blower from the arduous and exhausting work of sustaining the glass and the pipe in his hands during the blowing operation.

In carrying my invention into effect I first form a blank of the required size in a suitable mold by the pressing operation, and I attach the blank so formed to a pipe which is supported upon traveling carriages arranged upon the blower's stage by means of a universal-joint connection, so that the glass upon the end of the pipe may be swung in the pit beside the stage in substantially the same manner as is now done in the ordinary method of blowing, while the weight of the glass and the pipe is entirely sustained by the traveling carriages, thus relieving the blower of the necessity of supporting the weight of the glass and the pipe and enabling him to blow much larger and heavier cylinders than has heretofore been possible.

My invention consists in the novel construction, combination, and arrangement of parts hereinafter described and claimed.

Figure 1:
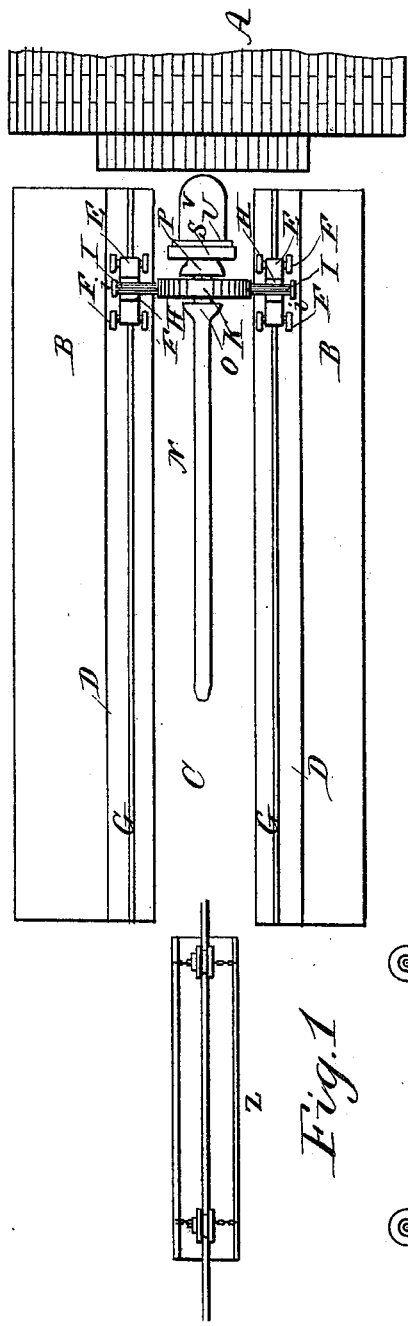
Figure 2:
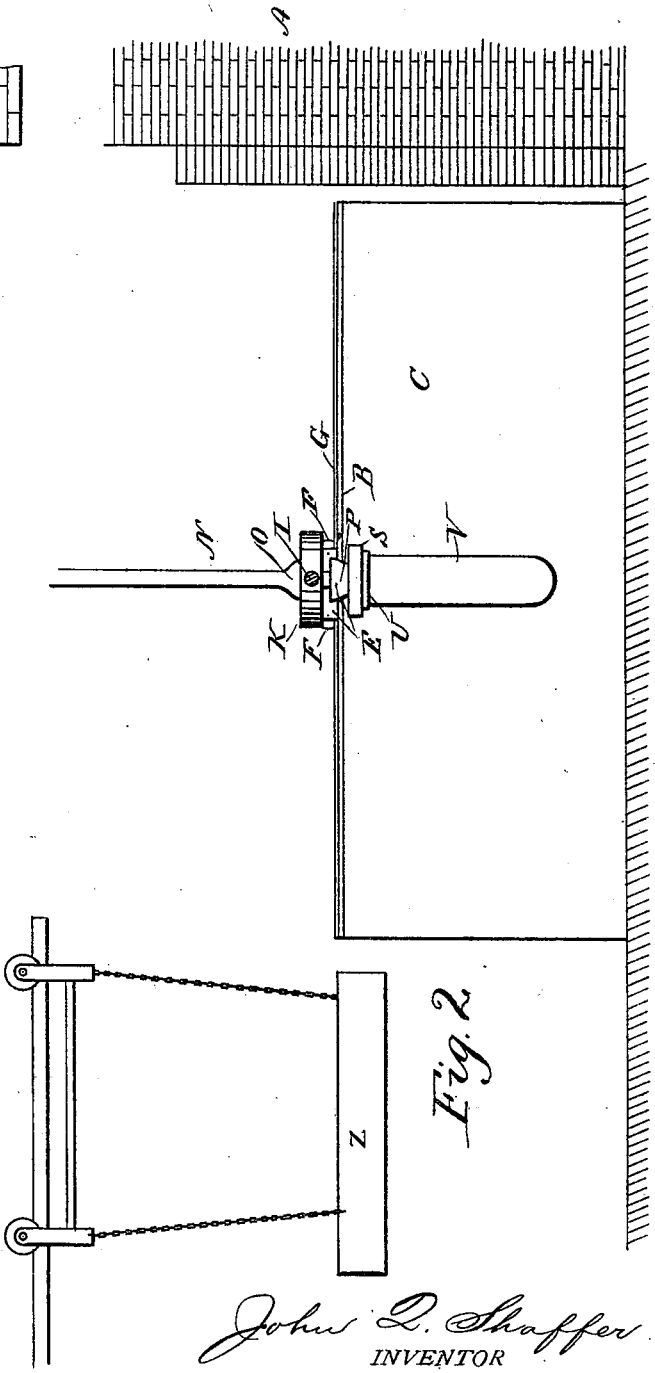

Referring to the accompanying drawings, Figure 1 is a plan view of a glass-furnace having my improved apparatus arranged on the stage in front of the same, the pipe being in the position in which it is held while the blank is being reheated. Fig. 2 is a side elevation showing the position of the pipe during the blowing operation; Fig. 3, a similar view showing the position of the pipe when the blown cylinder is being removed, and Fig. 4 a detail of part of the apparatus.

A designates the glass-furnace, and B B the stages on each side of the pit C. Upon the stages B B are tracks D D, upon which run carriages E E, supported on wheels F F. Sheers G G serve to guide the carriages E E, and the latter are formed with sockets H H for the reception of trunnions I I, projecting from each side of a ring K. The trunnions I I are formed with rings or flanges $i$ $i$, which serve to limit the horizontal movement of the trunnions in the sockets H H.

Within the ring K is a smaller ring L, which has trunnions M M, which are journaled in the ring K, and the trunnions M M being at right angles to the trunnions I I the inner ring L is capable of universal motion, while at the same time both rings may be moved laterally by sliding the trunnions I I laterally in the sockets H H and longitudinally by the movement of the carriages E E.

N designates the pipe, which passes loosely through the inner ring L and is formed with a shoulder O above the ring and a collar P below the same, so as to sustain the weight of the pipe and the attached glass on the ring and limit the upward movement of the pipe. Upon the lower end of the pipe N is fixed a disk S, having a screw-threaded flange T, that receives an exteriorly-screw-threaded collar U, which embraces the upper end of the blank V and serves as a means of attaching the blank to the pipe.

The operation of my improved apparatus is as follows: A blank is formed in a mold, and the mold is then opened and the blank and the surrounding collar U are removed and conveyed to the pit, and the collar and the blank are attached to the pipe by screwing the collar into the flange T of disk S. The pipe is now turned to a horizontal position and run up toward the furnace, so as to present the blank to the opening for the purpose of reheating the same. When the blank has been sufficiently heated, the pipe is raised to a vertical position, the blank swinging down in the pit, and the blower swings the blank to and fro, meanwhile blowing through the pipe until the blank has been blown to the desired form and size. During the entire time the blank and the blown cylinder are attached to the pipe the entire weight of both the pipe and the glass is sustained upon the traveling carriages and the blower is relieved of the heavy and exhausting work that has heretofore been imposed upon him and which has limited the size of the sheets which it was possible to produce by the old method, where the blower has had to sustain the entire weight of the pipe and the glass during the whole of the blowing operation. After the glass has been blown to the required size the blower draws the pipe and the attached cylinder of glass to the outer end of the stages B B and then turns the pipe to a horizontal position and allows the cylinder of glass to rest upon a tray Z. The glass is now separated from the pipe and conveyed on the tray to a suitable flattening-table, where it is cut and flattened in the usual manner.

Having described my invention, I claim—

1. In an apparatus for making sheet-glass, a pipe, means for attaching a blank to said pipe, a supporting-frame to which said pipe is attached by a universal joint and traveling carriages movable horizontally in right lines upon which said frame is mounted, substantially as described.

2. In an apparatus for making sheet-glass, a pipe, means for detachably securing a blank to the pipe, gimbal-rings supporting said pipe while allowing universal movement of the same, and movable supports for said rings all substantially as described.

3. In an apparatus for making sheet-glass, the combination with a pipe, means for attaching a blank to said pipe, means for supporting the pipe and allowing a universal motion of the same and means comprising supporting-carriages, movable horizontally in right lines for supporting said pipe while it is being moved horizontally, substantially as described.

In testimony whereof I have affixed my signature in presence of two witnesses.

JOHN Q. SHAFFER.

Witnesses:
JOSEPH B. CONNOLLY,
SIDNEY BIEBER.